United States Patent [19]

Henot

[11] Patent Number: 4,980,764

[45] Date of Patent: Dec. 25, 1990

[54] METHOD FOR THE ENCODING OF DATA FOR ASSISTANCE IN THE RECONSTRUCTION OF A SUB-SAMPLED MOVING ELECTRONIC IMAGE

[75] Inventor: Jean-Pierre M. Henot, Thorigne Fouillard, France

[73] Assignees: Etat Francais (CNET), Issy Les Moulineaux; Telediffusion de France, Montrouge Cedex, both of France

[21] Appl. No.: 369,258

[22] Filed: Jun. 21, 1989

[30] Foreign Application Priority Data

Jun. 24, 1988 [FR] France .............................. 88 08704

[51] Int. Cl.⁵ .................................... H04N 7/12
[52] U.S. Cl. .................................... 358/133; 358/138
[58] Field of Search ............... 358/133, 135, 136, 138, 358/140, 141, 12, 13, 105

[56] References Cited

U.S. PATENT DOCUMENTS

| | | | |
|---|---|---|---|
| 4,707,738 | 11/1987 | Ferre et al. | 358/138 |
| 4,710,810 | 12/1987 | Koga | 358/138 |
| 4,785,348 | 11/1988 | Fonsalas et al. | 358/12 |
| 4,802,005 | 1/1989 | Kondo | 358/136 |
| 4,845,560 | 7/1989 | Kondo et al. | 358/135 |
| 4,849,810 | 7/1989 | Ericsson | 358/133 |
| 4,853,778 | 8/1989 | Tanaka | 358/133 |
| 4,853,779 | 8/1989 | Hammer et al. | 358/133 |
| 4,862,264 | 8/1989 | Wells et al. | 358/138 |

*Primary Examiner*—Victor R. Kostak
*Attorney, Agent, or Firm*—Barnes & Thornburg

[57] ABSTRACT

A method for encoding data for assistance in the reconstruction of sub-sampled moving electronic images, particularly HDTV images transmitted by MAC channel, optimizing the representation of the assistance data while minimizing the corresponding throughput of data through compression of the image signal by segmentation of the image into homogeneous blocks of different sizes. An imbricated, hierarchical encoding is achieved on the image blocks, for assigning to the blocks a choice of processing, on the one hand, and a motion vector, on the other hand. When the sub-sampling/reconstruction processing chosen is of the motion compensation type (way 4) and wherein assistance data are generated under the control of a sequencer locked into a predetermined image scanning procedure, segmentation information is selectively generated solely for the non-elementary blocks, and information on choice of motion vector is selectively generated only during the occurrence of a block with optimal processing by motion compensation.

9 Claims, 8 Drawing Sheets

METHOD FOR THE ENCODING OF DATA FOR ASSISTANCE IN THE RECONSTRUCTION OF A SUB-SAMPLED MOVING ELECTRONIC IMAGE

BACKGROUND OF THE INVENTION

A television image or picture is defined by a certain number of parameters that represent the spatial and temporal analysis of this image (in particular, the number of images per second, lines per image and pixels per line).

The passband necessary to transmit an HDTV image may attain values of the order of 100 MHz. Thus, to transmit these images on passband channels with reduced width (for example, satellite channels with a band of the order of about ten megahertz), it is necessary to apply passband reduction techniques to these images.

The passband of the signal to be transmitted can be reduced by using adaptive techniques for filtering the high definition image. This filtered high definition image then has a reduced basic passband and may be re-sampled at lower frequencies for transmission. As the filterings are selected in an adaptive way at the transmitter, assistance data are transmitted to the decoder so that it recognizes the processing chosen at the encoder.

These items of assistance data therefore consist of an indicator of the chosen processing, but may also include motion vectors when motion compensation is used.

The throughput rate of the assistance data in the transmission channel is limited to about 1 Mbit/s.

The large quantity of information that these items of data represent makes it necessary to use throughput reduction techniques.

Any throughput reduction method may be described in terms of two consecutive steps:
1. Reduction of the flow of information to be transmitted;
2. Encoding (or representation) of the information for transmission.

The two steps have the following properties:

the reduction of the data is irreversible for it modifies the original signal. In this case, the reduction of information may consist in making a choice concerning a set of pixels rather than each pixel;

the encoding of the information is reversible. This step consists in placing the information in the form of a sequence of bits which represents the information completely.

These two steps may produce a reduction in the throughput rate.

A French patent application has been filed for a method to reduce the throughput rate of a sequence of data for assistance in the reconstruction of an electronic image using a sub-sampling signal (File Application No. 8802650 dated 2nd March 1988 on behalf of the present Applicants).

However, the invention described therein in no way resolves the problem of the encoding of information for transmission.

SUMMARY OF THE INVENTION

According to the invention, this problem as well as others which shall appear further below are resolved by means of a method for the encoding of data for assistance in the reconstruction of an electronic image belonging to a sequence of images, notably in HDTV, using a compressed image signal, the process of compression of the image signal consisting in the segmentation of the image into substantially homogeneous blocs of variable sizes $i \times i$ for which all the pixels may be defined collectively, the possible sizes being capable of classification according to levels of segmentation, from a minimal size of elementary blocks, each level corresponding to the regrouping of four lower level adjacent blocks, said compression process comprising a selection step, for each elementary image block, of an optimal processing among several concurrent compression processing operations achieved in parallel, the processing operations comprising notably, on the one hand, at least one compression processing operation by image filtering and, on the other hand, at least one compression processing operation by motion compensation, a method wherein said assistance data comprise, essentially, for each block, firstly a piece of information on the choice of processing associated with a piece of information on the segmentation of the block, and secondly, in case of a choice of compression processing by motion compensation for the current block, a piece of motion vector information representative of said block associated with a piece of information on segmentation of the block, and wherein, in a first stage, a hierarchical encoding in increasing order is achieved, on at least two levels of segmentation, for the information on choice of processing operation and, in a second stage, in case of a choice of processing with motion compensation for a non-elementary block identified in the first stage, a hierarchical encoding in increasing order, on at least two levels of segmentation, for the motion information, and wherein said assistance data are generated under the control of sequencing means locked into a predetermined image scanning procedure, in selectively generating pieces of segmentation information only for the non-elementary blocks and in selectively generating pieces of information on motion vector choice only during the occurrence of a block with optimal processing by motion compensation.

Advantageously, said hierarchical encoding of the information on processing choice is done by an operation comprising the following steps:

for each processing, a bit on processing choice associated with each elementary block of the image is positioned, said bit taking the information on validity or non-validity of the corresponding processing for the associated block;

the positions taken by the processing choice bits at the upper level of segmentation are explored iteratively, and the existence of a block with homogeneous processing is validated at said upper level in case of homogeneity of the processing choice bits for all the blocks forming said upper level of segmentation.

At the same time, said hierarchical encoding of the motion information is preferably done by an operation comprising the following steps:

the value of the motion vector associated with a first elementary block is memorized, and a counter associated with said motion vector is initialized;

the value of the motion vector associated with the higher level of segmentation is explored iteratively, in incrementing said counter at each occurrence of said motion vector, and a validation is done of the existence of a homogeneous motion block at said upper level of segmentation in the event of homogeneous processing by motion compensation at said upper level of segmentation and when said counter marks the number of blocks comprising said upper level of segmentation.

Advantageously, with each i×i block, at all the segmentation levels, there is associated, firstly, a first bit of homogeneity of processing choice and/or secondly a second bit of homogeneity of the motion,
and all said first and/or second bits are positioned systematically, in parallel for each level of segmentation, and independently of the value of the bit corresponding to the lower level of segmentation.

Furthermore, preferably, said assistance data are generated in the form of a sentence of variable length, emitted for each superblock of the maximal level of segmentation, each sentence comprising at least one of the following words:
a first word identifying the processing choice segmentation in said superblock;
at least one second word identifying said processing associated with each homogeneous i×i block of a maximal level;
a third word identifying the segmentation of motion in said superblock;
at least one fourth word identifying the motion vector at each i×i block of maximum level with processing by motion compensation and homogeneous motion vector.

Advantageously, said first word and/or said third word are transmitted in a sentence only when there is at least one non-elementary homogeneous block in the current block of the maximum segmentation level, and at least one fourth word is transmitted only in the event of occurrence of an i×i block with motion compensation treatment.

In the preferred embodiment, said words are stored in storage means addressed by said first and/or second homogeneity bits, and each of said words is encoded distinctly on a common format of the same length, and the words of a given sentence are transmitted in an implicit order known to the receiver.

BRIEF DESCRIPTION OF THE DRAWINGS

Other characteristics and advantages of the invention will emerge from the following description of a preferred embodiment, given as a non-restrictive illustration, and the appended drawings wherein.

DESCRIPTION OF PREFERRED EMBODIMENTS

In the particular, but non-restrictive, case of the encoding of an HDTV image for transmission in an HD-MAC channel, one possible approach lies making a choice, in each image zone, among four possible types of sub-sampling. The optimum sub-sampling is chosen at the encoder and the corresponding sub-sampled pixels are transmitted to the decoder. In addition, this decoder receives the assistance data that enable it to reconstruct the HD (high definition) image as efficiently as possible.

Four sub-sampling processing operations are possible:
3 linear filtering processing operations, namely:
1 filtering operation for zero motions,
1 filtering operation for motions of mean amplitude,
1 filtering operation for motions of high amplitude.

The fourth processing operation is a processing operation that uses motion compensation.

Figure 1:
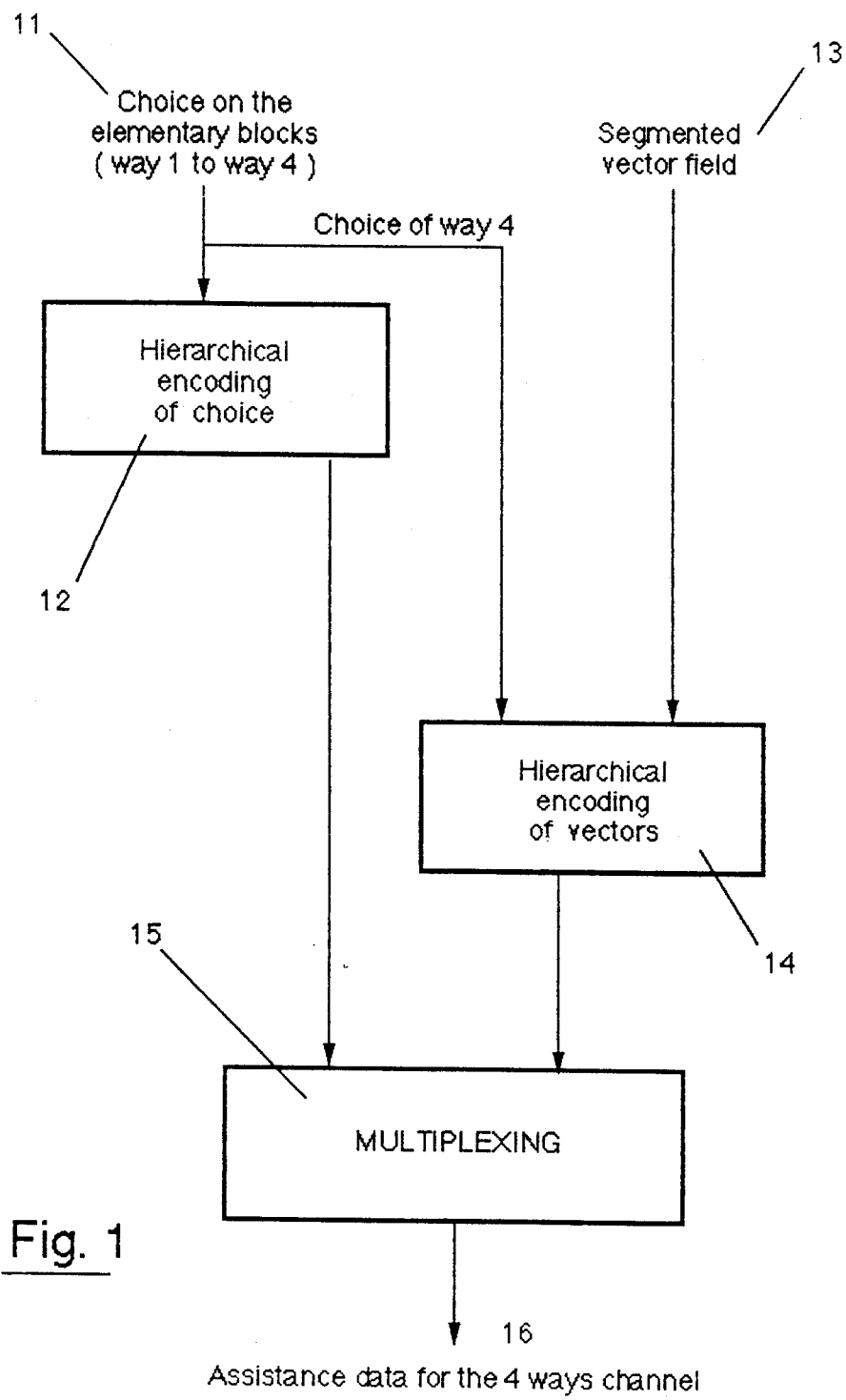
FIG. 1 illustrates the principle of imbricated hierarchical encoding according to the invention.

The original aspect of this approach lies the definition of an imbricated hierarchical encoding. That is, in a first stage, a description is made of the information on processing choice 11 (way 1 to way 4) on the image blocks by means of a hierarchical encoding 12 (or by quadtree). (FIG. 1).

Then, for the blocks processed by the way 4 (motion compensation way), the motion vectors used for this block are again described by a hierarchical encoding 14. This gives an imbricated, hierarchical encoding structure which is multiplexed (15).

The information described in this way to the encoder (FIG. 3) is transmitted (16) to the decoder (FIG. 7a-7b), which then recovers the processing done at each image block and, possibly, the associated motion vectors.

At the input to the imbricated hierarchical encoding, the following are available:
a piece of information on choice of processing by elementary block (11);
a segmented field of vectors (13).

It must be recalled that the high definition image comprises:
1440 useful pixels per line,
1150 useful lines per image,
25 images per second.

The useful lines of the image are interlaced in two frames of 575 lines (two frames form an image).

The size of the elementary blocks on which the choice of processing is done is 8 pixels by 8 lines in the frame, on two frames (giving 128 points).

The HD image is formed by 180 blocks horizontally and 72 blocks vertically, giving a total of 12960 blocks.

The vector field is segmented beforehand, i.e. to each elementary block there corresponds a single vector.

Besides, the HD image is sub-divided into 16 zones of equal sizes, each zone being assigned 15 motion vectors available to characterize the shifts of the elementary blocks processed by the way 4.

During the hierarchical encoding, all that is available is the vector number indicating the vector chosen from among the fifteen available vectors, in the 1/16th of an image concerned. The amplitude of the vectors is transmitted besides.

Figures 2, 8:
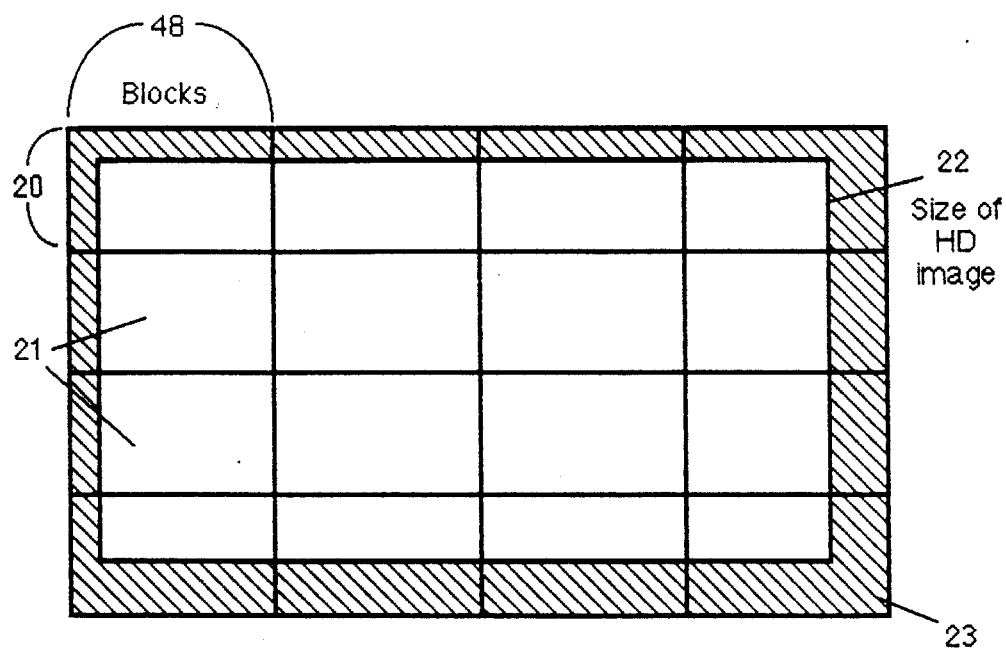
FIG. 2 illustrates the cutting up of the high-definition image into portions of about 1/16th of an image, each portion comprising about 20×48 elementary image blocks.
FIG. 8 shows an example of a configuration of selective processing of the 16 blocks of a 4×4 superblock.

The subdivision into image zones is done as follows, in relation with FIG. 2.

The cumulated size of the sixteen sub-images 21 is greater than that of the HD image 22. In the hatched zone 23, the vectors are assumed to be constant, and this zone is not taken into account by the hierarchical encoding.

We thus have, for each elementary block of:

4 bits (31) bi (i=1 to 4) indicating the chosen processing operation:
  bi=0, processing i not chosen
  bi=1, processing i chosen
Only one bi is non-null at a time.

4 bits (32) Vi (i=1 to 4) indicating the number of the vector in the concerned image zone.

The three imbricated hierarchical encoding steps therefore consist in:
1. the hierarchical encoding of the chosen processing operation (12)
2. the hierarchical encoding of the vectors for the way 4 (14)
3. the multiplexing of the data resulting from the two hierarchical encodings (15).

FIGS. 3 to 6 illustrate the sequential working of a preferred device for the implementation of the operation.

At input, there is the choice of processing by elementary blocks of 8 pixels by 8 lines by 2 frames.

This choice consists of 4 bits (31) called validity bits. The segmentation consists in indicating whether the choice is homogeneous on a superblock comprising 4 or 16 elementary blocks.

Figure 4:
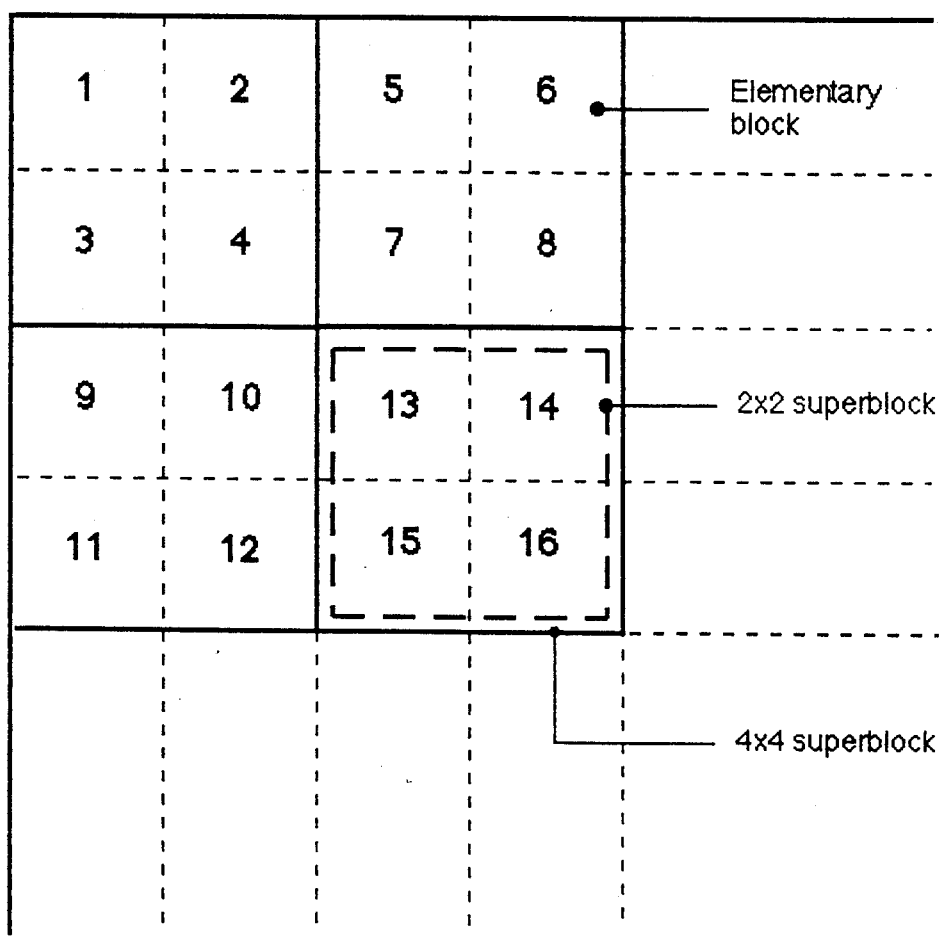
FIG. 4 illustrates the order of scanning of the elementary blocks in a 4×4 superblock, in a preferred mode of implementation of the invention.
Figure 5:
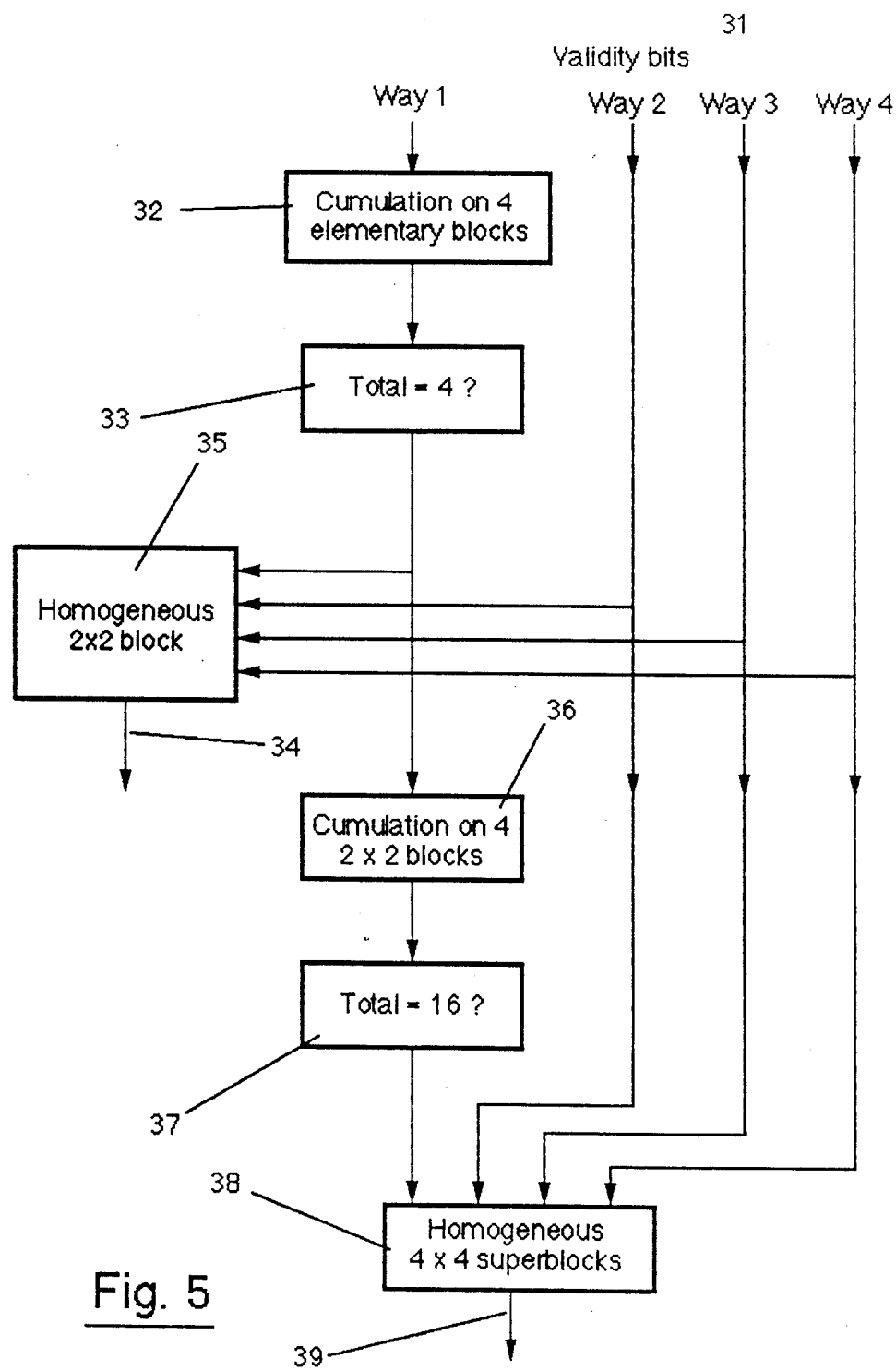
FIG. 5 illustrates the principle of hierarchical encoding in increasing order for the image segmentation operation, as a function of the choice of processing.
Figure 6:
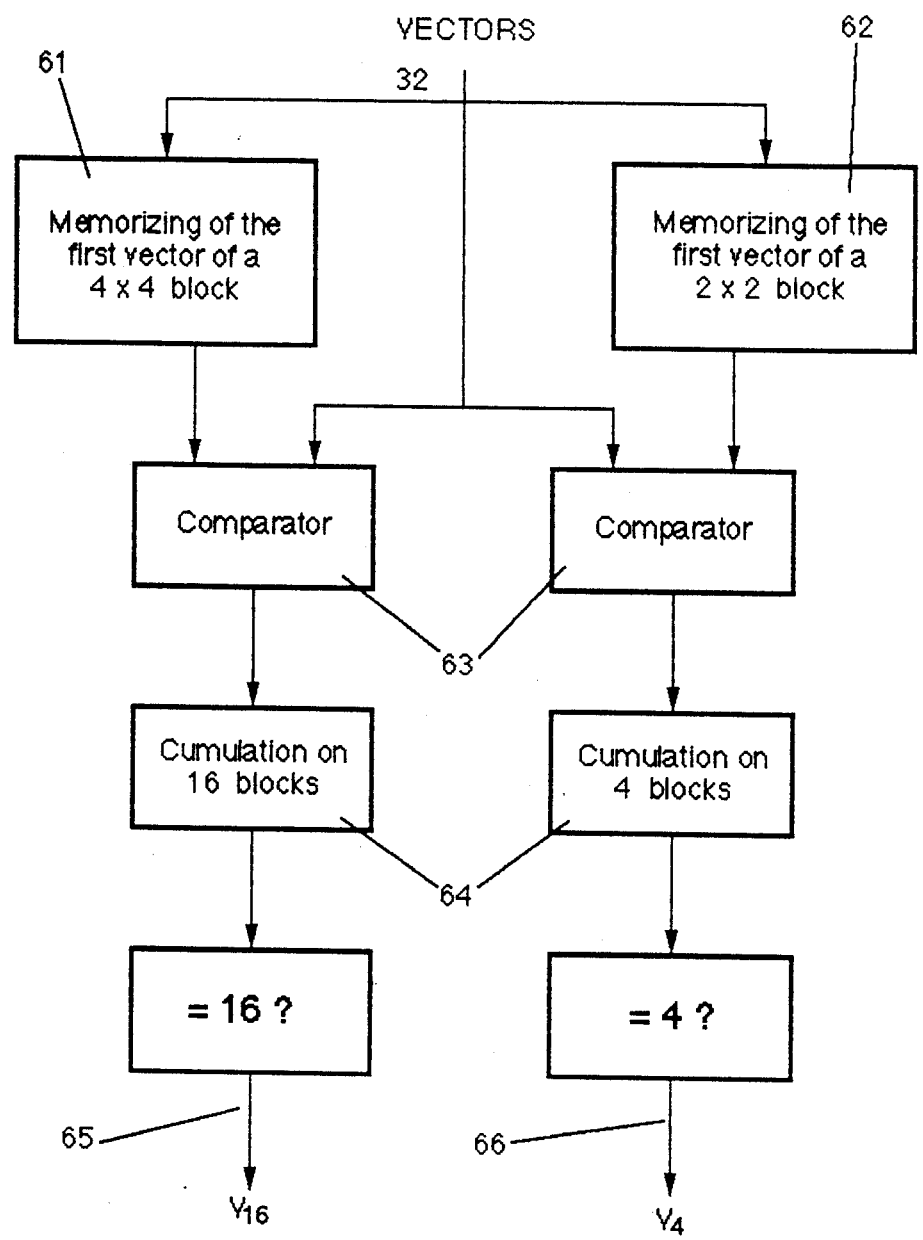
FIG. 6 illustrates the principle of hierarchical encoding in increasing order, according to the invention, for image segmentation as a function of the motion vectors of blocs processed by the method or "way" of compression by motion compensation.

The order of input of the values (validity bits) is the one indicated in FIG. 4.

A cumulation (32) is made of the validity bits of the ways 1, 2, 3 and 4 on four elementary blocks (blocks 1 to 4, then 5 to 8, then 9 to 12, then 13 to 16 . . . ). In comparing (33) the cumulated total with 4, it becomes possible to know whether the block consisting of 4 elementary blocks is homogeneous (35). The indication of this homogeneity consists of 1 bit C4 34. The cumulation 36 is also done on the bits 1 to 16 (then 17 to 32 on the following superblock). This makes it possible, by comparing (37) the total with 16, to know if the superblock is homogeneous (38).

For one superblock, there are four bits C4 34 available which are stored and one bit C16 39 which indicates the segmentation of the superblock.

C16=1: the 4×4 block made up of 16 elementary blocks is homogeneous;
C16=0: 4×4 block non-homogeneous;
C4=1: the 2×2 block consisting of 4 elementary blocks is homogeneous;
C4=0: 2×2 block non-homogeneous.
These five bits totally describe the segmentation of the superblock.

The segementation of the vectors is quite similar to that of the choice of processing. However the input data 32 (the vectors) may assume the 15 of the 16 possible values permitted to them by the 4 bits on which they are defined (whereas the validity bits 31, on 4 bits, took only 4 possible values, one bit at 1 inducing a state where the others were at 0).

The segmentation no longer takes place solely by the accumulation of bits. It is necessary to store the first vector of each 2×2 superblock 62 or 4×4 block 61 and compare (63) the vectors with this value. The cumulation 64 of the results of the comparisons makes it possible to know whether the bloc is homogeneous.

The result consists in:
the bit v16 65 which indicates whether the field of vectors is homogeneous on the superbloc 4×4.
4 bits v4 66 which indicate whether the field is homogeneous on each 2×2 superblock. These bits are stored.
The values corresponding to the choices and to the vectors are stored (43, 44, 45, 46).

The set of assistance data consists in:
the segmentation of the indication of the chosen processing;
the choice of processing;
the segmentation of the field of vectors for the blocks processed by the way 4;
the vectors for the blocks processed by the way 4.

These items of data are described in the form of 6-bit words called events, the values of which are to be found in PROMs called "events" (47, 48, 49, 50, 51).

4 words correspond to the choices: way 1 to way 4.
17 words correspond to the segmentation of the data indicating the choice of processing (corresponding to situations that range from a homogeneous 4×4 superblock to the case of non-homogeneous 2×2 blocks) and are generated (or addressed) from C4, C16;
15 words correspond to 15 possible vectors;
17 words correspond to the segmentation of the field of vectors for a 4×4 superblock processed by the way 4;
2 words correspond to the segmentation of the field of vectors for a 2×2 superblock processed by way 4.

A example of the depiction of these words on 6 bits is shown in Table I.

The imbricated hierarchical encoding comes into play in the fact that the vectors are transmitted only when there is a block in way 4 and when the segmentation of the vector field depends on the size of the way 4 block.

In particular, when the way 4 block has the size of an elementary block, no segmentation is to be transmitted because the vector field can no longer be segmented.

TABLE I

Table of Events

| | | |
|---|---|---|
| | 000001 | homogeneous 4 × 4 block |
| 17 words | 000010 | non-homogeneous 4 × 4 block/ description of homogeneous or non-homogeneous 2 × 2 blocks |
| | 010001 | |
| | 010010 | way 1 |
| 4 words | 010011 | way 2 |
| | 010100 | way 3 |
| | 010101 | way 4 |
| | 010110 | homogeneous 4 × 4 field (in the case of a 4 × 4 block processed by way 4) |
| | 010100 | |
| 17 words | | non-homogeneous 4 × 4 field/ description in homogeneous or non-homogeneous 2 × 2 blocks |
| | 100100 | |
| 2 words | 100101 | homogeneous or non-homogeneous 2 × 2 field (in the case of a |
| | 100110 | 2 × 2 block processed by way 2) |
| | 100111 | vectors 1 to 15 |
| 15 words | ..... | |
| | ..... | |
| | 110101 | |

Starting from the segmentations of the processing choice and the vector fields, as well as the indication of the blocks processed by the way 4, it generates the signals that enable the reading of the events in the corresponding memories and that enable their multiplexing (53).

Once multiplexed, the events are stored in the events buffer (52).

The buffer (52) is the element enabling the flow of data to be regulated. It is a 6-bit memory that can contain 1024 words. The data are written therein at a rate depending on the local clock (54) and are read at a rate depending on the clock of the channel (55).

Figure 3:
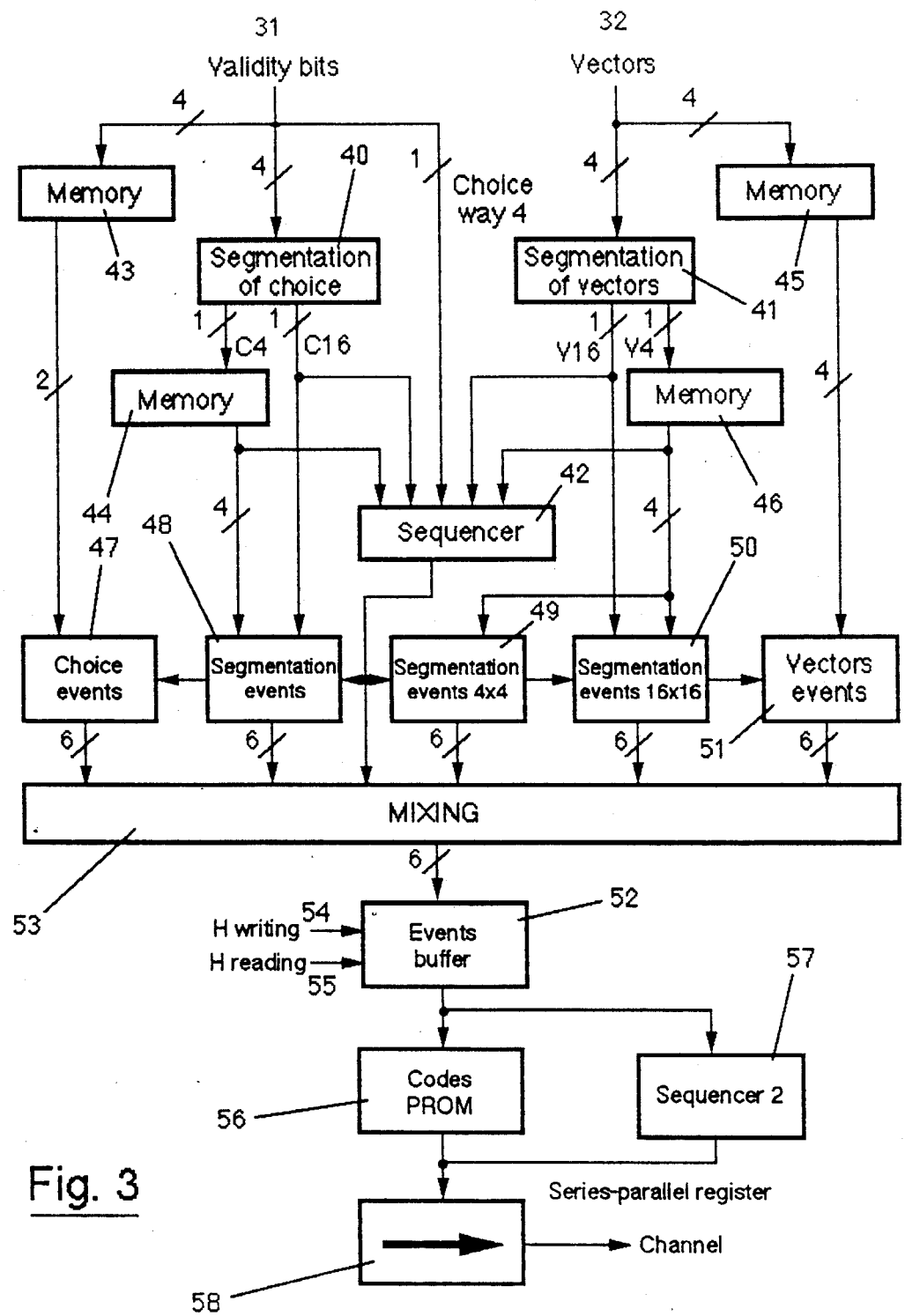
FIG. 3 is a block diagram illustrating a preferred functional layout in an encoder for the implementation of the method according to the invention, at transmission.

As shown in FIG. 3, the emission consists of three elements:
1 codes PROM 56 that contains the words of variable length corresponding to the different events described.
1 sequencer 57 indicating the valid bits.
1 series parallel register 58 that enables the formatting of the data for the use of the channel.

TABLE II

| Words Emitted | |
|---|---|
| 1 | homogeneous superblock |
| 00000 | 16 words possible; segmentation |
| ... | into 2 × 2 blocks, |
| 01111 | homogeneous or non-homogeneous |
| 00 | way 1 choice |
| .. | : |
| 11 | way 4 choice |
| 1 | homogeneous 4 × 4 field |
| 0 | 2 × 2 non-homogeneous field |
| 00000 | 16 words possible/segmentation |
| .. | of fields |
| 01111 | into 2 × 2 blocks |
| 1 | homogeneous 2 × 2 field |
| 0 | non-homogeneous 2 × 2 field |
| 0000 | 15 words → 15 vectors |
| .. | |
| 1110 | |

Figure 7A:
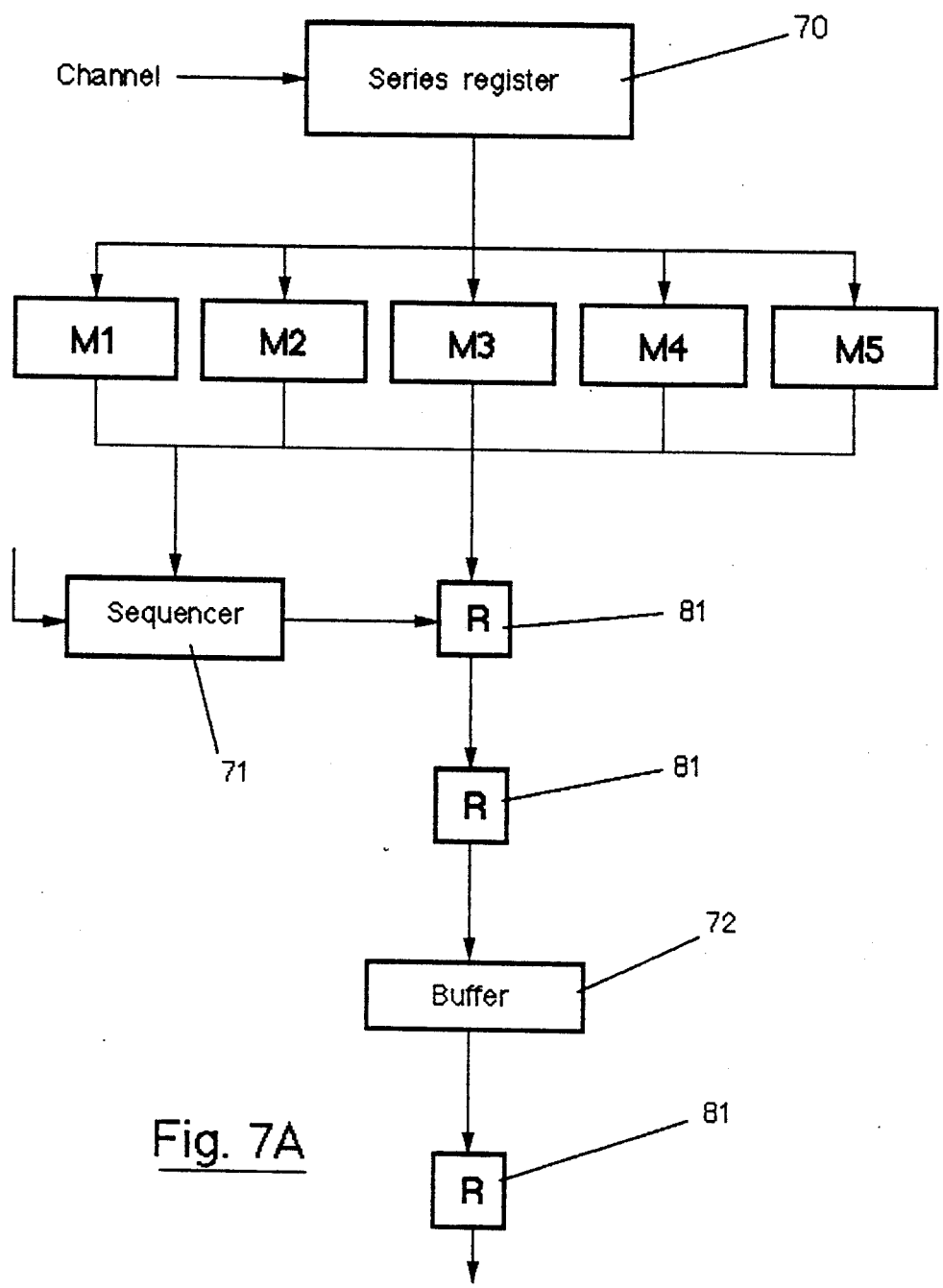
FIGS. 7a and 7b are a block diagram of a preferred physical layout in a decoder for the implementation of the method according to the invention, at reception.
Figure 7B:
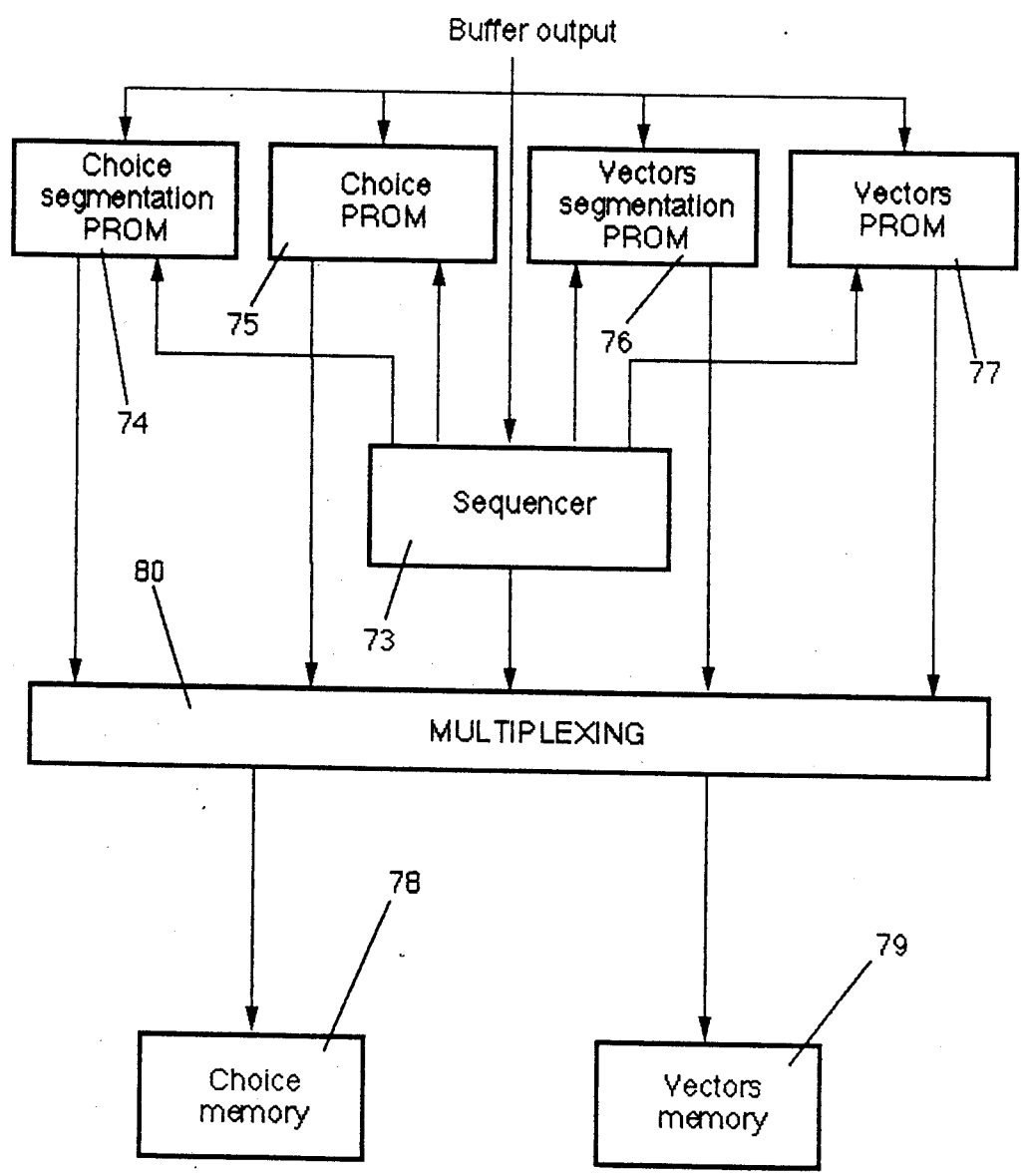

As shown in FIG. 7a, 7b, the processing, at reception, of the sequences of assistance data is as follows.

The bits are received at the decoder in the form of a series train received in a series register 70.

Since the biggest words contain 5 bits, this series train is de-serialized to obtain 5-bit words which could be thus interpreted.

The memories M1, M2, M3, M4, M5 interpret the 5-bit words received in order to reformat them in the form of events 47, 48, 49, 50, 51 described in FIG. 3, which are fixed length words.

The memory M1 corresponds to the events of segmentation of the indication of processing choice.

The memory M2 corresponds to the processing choice.

The memory M3 corresponds to the segmentation on the basis of the 4×4 superblocks.

The memory M4 corresponds to the segmentation on the basis of the 2×2 superblocks.

The memory M5 corresponds to the motion vectors.

On the basis of the events received, a sequencer 71 determines the events to be received and manages the data to be sent to the buffer memory 72. The circuits 81 are registers.

The buffer memory (72) contains events. Its size makes it possible to contain the maximum number of events which may be necessary to describe a block, namely about 32 events.

It is written with a clock derived from the channel clock and read with a clock derived from the clock internal to the decoder (clock synchronous with the image).

By means of a new sequencer 73 and memories 74, 75, 76, 77 interpreting the events, the values of the processing choices and motion vectors are stored in appropriate memories 78, 79 for the 16 elementary blocks that form the 4×4 superblock after multiplexing 80. By way of example, the descriptive sequence of the 4×4 superblock shall be expressed as follows:

a first word (segmentation by processing choice) signifying: "here is a 4×4 superblock comprising the first, third and fourth homogeneous 2×2 blocks, the second 2×2 block being non-homogeneous."

7 words respectively describing: the choice of processing for the first 2×2 superblock, the four processing choices for the elementary blocks of the second 2×2 superblock; the choice of processing for the third and fourth homogeneous 2×2 blocks (4;4,3,3,2;4;2);

1 word indicating that the first 2×2 superblock, with homogeneous processing by the motion compensation way 4, is homogeneous from the point of view of the representing motion vector. This word is followed by a word designating the fact that representing vector is the twelfth vector.

1 word indicating that the third 2×2 superblock with homogeneous processing by the motion compensation way 4 is a non-homogeneous block from the viewpoint of the motion vectors of the elementary blocks. This word is followed by the four words respectively designating, in the order of scanning, the four vectors representing each of the elementary blocks of the 2×2 superblock.

What is claimed is:

1. A method for encoding assistance data for use in the reconstruction of an electronic image belonging to a sequence of images using a compressed image signal, wherein the compression of the image signal comprises the steps of:

dividing the electronic image into elementary image blocks containing a fixed number of pixels, selecting an optimal processing operation from among several concurrent compression processing operations achieved in parallel for each elementary image block, the processing operations comprising at least one compression processing operation by image filtering and at least one compression processing operation by motion compensation, segmenting the image into substantially homogeneous superblocks of variable size i×i for which all elementary image blocks are defined collectively, and classifying each superblock according to the level of segmentation from a minimum size containing a single elementary image block, each level corresponding to the regrouping of four lower level adjacent blocks, the encoding method comprising the steps of:

generating for at least two levels of segmentation a first code for each superblock representing the homogeneity of the superblock, the compression processing employed, and the level of segmentation, generating a second code for each superblock representing a motion vector where motion compensation compression processing is employed and the level of segmentation, and Starting from the segmentations of the processing choice and the vector fields, as well as the indication of the blocks processed by the way 4, it generates the signals that enable the reading of the events in the corresponding memories and that enable their multiplexing (53).

Once multiplexed, the events are stored in the events buffer (52).

The buffer (52) is the element enabling the flow of data to be regulated. It is a 6-bit memory that can contain 1024 words. The data are written therein at a rate depending on the local clock (54) and are read at a rate depending on the clock of the channel (55).

As shown in FIG. 3, the emission consists of three elements:

1 codes PROM 56 that contains the words of variable length corresponding to the different events described.
1 sequencer 57 indicating the valid bits.
1 series parallel register 58 that enables the formatting of the data for the use of the channel.

TABLE II

| | Words Emitted |
|---|---|
| 1 | homogeneous superblock |
| 00000 | 16 words possible; segmentation |
| ... | into 2 × 2 blocks, |
| 01111 | homogeneous or non-homogeneous |
| 00 | way 1 choice |
| .. | : |
| 11 | way 4 choice |
| 1 | homogeneous 4 × 4 field |
| 0 | 2 × 2 non-homogeneous field |
| 00000 | 16 words possible/segmentation |
| .. | of fields |
| 01111 | into 2 × 2 blocks |
| 1 | homogeneous 2 × 2 field |
| 0 | non-homogeneous 2 × 2 field |
| 0000 | 15 words → 15 vectors |
| .. | |
| 1110 | |

As shown in FIG. 7a, 7b, the processing, at reception, of the sequences of assistance data is as follows.

The bits are received at the decoder in the form of a series train received in a series register 70.

Since the biggest words contain 5 bits, this series train is de-serialized to obtain 5-bit words which could be thus interpreted.

The memories M1, M2, M3, M4, M5 interpret the 5-bit words received in order to reformat them in the form of events 47, 48, 49, 50, 51 described in FIG. 3, which are fixed length words.

The memory M1 corresponds to the events of segmentation of the indication of processing choice.

The memory M2 corresponds to the processing choice.

The memory M3 corresponds to the segmentation on the basis of the 4×4 superblocks.

The memory M4 corresponds to the segmentation on the basis of the 2×2 superblocks.

The memory M5 corresponds to the motion vectors.

On the basis of the events received, a sequencer 71 determines the events to be received and manages the data to be sent to the buffer memory 72. The circuits 81 are registers.

The buffer memory (72) contains events. Its size makes it possible to contain the maximum number of events which may be necessary to describe a block, namely about 32 events.

It is written with a clock derived from the channel clock and read with a clock derived from the clock internal to the decoder (clock synchronous with the image).

By means of a new sequencer 73 and memories 74, 75, 76, 77 interpreting the events, the values of the processing choices and motion vectors are stored in appropriate memories 78, 79 for the 16 elementary blocks that form the 4×4 superblock after multiplexing 80. By way of example, the descriptive sequence of the 4×4 superblock shall be expressed as follows:

a first word (segmentation by processing choice) signifying: "here is a 4×4 superblock comprising the first, third and fourth homogeneous 2×2 blocks, the second 2×2 block being non-homogeneous."

7 words respectively describing: the choice of processing for the first 2×2 superblock, the four processing choices for the elementary blocks of the second 2×2 superblock; the choice of processing for the third and fourth homogeneous 2×2 blocks (4;4,3,3,2;4;2);

1 word indicating that the first 2×2 superblock, with homogeneous processing by the motion compensation way 4, is homogeneous from the point of view of the representing motion vector. This word is followed by a word designating the fact that representing vector is the twelfth vector.

1 word indicating that the third 2×2 superblock with homogeneous processing by the motion compensation way 4 is a non-homogeneous block from the viewpoint of the motion vectors of the elementary blocks. This word is followed by the four words respectively designating, in the order of scanning, the four vectors representing each of the elementary blocks of the 2×2 superblock.

What is claimed is:

1. A method for encoding assistance data for use in the reconstruction of an electronic image belonging to a sequence of images using a compressed image signal, wherein the compression of the image signal comprises the steps of:

dividing the electronic image into elementary image blocks containing a fixed number of pixels, selecting an optimal processing operation from among several concurrent compression processing operations achieved in parallel for each elementary image block, the processing operations comprising at least one compression processing operation by image filtering and at least one compression processing operation by motion compensation, segmenting the image into substantially homogeneous superblocks of variable size i×i for which all elementary image blocks are defined collectively, and classifying each superblock according to the level of segmentation from a minimum size containing a single elementary image block, each level corresponding to the regrouping of four lower level adjacent blocks, the encoding method comprising the steps of:

generating for at least two levels of segmentation a first code for each superblock representing the homogeneity of the superblock, the compression processing employed, and the level of segmentation, generating a second code for each superblock representing a motion vector where motion compensation compression processing is employed and the level of segmentation, and multiplexing the codes together under the control of a sequencing means locked into a pre-determined image scanning procedure such that segmentation information is retained only for superblocks containing more than one elementary image block, and motion vector information is expressed only for blocks where motion compensation compression processing is employed.

2. The encoding method of claim 1 wherein the first code generating step comprises:

associating with each superblock at each level of segmentation a bit signifying the compression processing employed and another bit signifying the validity of such compression processing, exploring iteratively the validity of all blocks within each superblock, and retaining the code for the highest level superblock in which the bit signifying the compression processing employed is uniform for all blocks forming the superblock.

3. The encoding method of claim 1 wherein the second code generating step comprises:

associating with each elementary block a bit group signifying the value of the corresponding motion vector, exploring iteratively the bit groups of all blocks within each superblock, and retaining the code for the highest level superblock in which the bit group signifying the motion vectors in each block is uniform.

4. The encoding method of claim 3 wherein the second code generating step further comprises:

initializing a counter associated with a first elementary block having a motion vector within each superblock, during said iterative exploration incrementing said counter at each occurrence of a same value motion vector within each superblock, and examining the counter at the end of each iterative exploration to determine the homogeneity of the superblock.

5. The encoding method of claim 1 wherein the multiplexing step comprises:

forming a sentence of a variable number of words for each superblock at the maximum level of homogeneous segmentation, each sentence including at least one word selected from the group consisting of:

a first word identifying the segmentation level of the superblock, a second word identifying the type of compression processing operation associated with the superblock, a third word identifying the segmentation of motion within the superblock, and a fourth word identifying the motion vector of the superblock.

6. The encoding method of claim 5 further comprising the step of transmitting the first or third word only for superblocks containing more than one elementary image block.

7. The encoding method of claim 5 further comprising the step of transmitting the fourth word only for blocks where motion compensation compression processing is employed.

8. The encoding method of claim 5 further comprising the steps of:

encoding each of the words in a common format of the same length, and transmitting the words of each sentence in an implicit order recognizable by a receiver.

9. The encoding method of claim 1 wherein each elementary image block comprises a rectangular unit of 8 pixels on 8 adjacent lines of each of 2 consecutive frames.

* * * * *